(12) United States Patent
Rahman

(10) Patent No.: US 7,496,078 B2
(45) Date of Patent: Feb. 24, 2009

(54) ROUTE TREE BUILDING IN A WIRELESS MESH NETWORK

(75) Inventor: Shahriar I. Rahman, Morgan Hill, CA (US)

(73) Assignee: Cisco Technology, Inc., San Jose, CA (US)

( * ) Notice: Subject to any disclaimer, the term of this patent is extended or adjusted under 35 U.S.C. 154(b) by 442 days.

(21) Appl. No.: 11/464,568

(22) Filed: Aug. 15, 2006

(65) Prior Publication Data
US 2008/0043637 A1    Feb. 21, 2008

(51) Int. Cl.
H04Q 7/20    (2006.01)

(52) U.S. Cl. ............... 370/338; 370/349; 455/426.1; 455/41.2

(58) Field of Classification Search ............... 370/406, 370/407, 408
See application file for complete search history.

(56) References Cited

U.S. PATENT DOCUMENTS

| 6,026,303 | A | 2/2000 | Minamisawa | 455/446 |
|---|---|---|---|---|
| 6,791,949 | B1 | 9/2004 | Ryu et al. | 370/254 |
| 6,917,985 | B2 * | 7/2005 | Madruga et al. | 709/238 |
| 2003/0126299 | A1 * | 7/2003 | Shah-Heydari | 709/252 |
| 2003/0145092 | A1 | 7/2003 | Funato et al. | 709/229 |
| 2006/0253735 | A1 * | 11/2006 | Kwak et al. | 714/12 |
| 2006/0285529 | A1 * | 12/2006 | Hares et al. | 370/338 |

OTHER PUBLICATIONS

PCT Search Report on PCT Application PCT/US07/75769.
P. Calhoun, M. Montemurro and D. Stanley, "CAPWAP Protocol Specification: draft-ietf-capwap-protocol-specification-01," Network Working Group, Internet-Draft, May 5, 2006. Available online at: http://tools.ietf.org/html/draft-ietf-capwap-protocol-specification-01.
"Cisco Compatible Extensions: Versions and Features," Cisco Systems, Inc., San Jose, CA. Downloaded Aug. 1, 2006 from: http://www.cisco.com/warp/public/765/ccx/versions_and_features.shtml.

* cited by examiner

*Primary Examiner*—Nick Corsaro
*Assistant Examiner*—Vladimir Magloire
(74) *Attorney, Agent, or Firm*—Dov Rosenfeld; Inventek

(57) ABSTRACT

In one embodiment, a tree-topology building method for a wireless mesh network includes using a centralized parent selection process to select a parent and join offer messages to a selected child of the selected parent.

20 Claims, 6 Drawing Sheets

ROUTE TREE BUILDING IN A WIRELESS MESH NETWORK

TECHNICAL FIELD

The present disclosure relates generally to wireless mesh networks.

BACKGROUND

Wireless mesh networks have recently become popular. In particular, wireless mesh networks that operate under one of the IEEE 802.11 wireless local area network (WLAN) standards have recently become popular. An example wireless mesh network includes wireless access points (APs) used outdoors to connect to client stations. The access points also each act as mesh points of a wireless mesh network, e.g., using an additional radio transceiver for the mesh backbone connection to route traffic between the mesh points, called mesh APs. Such mesh access points may be used, for example, to cover large metropolitan areas.

Recently, there has been a move in wireless networks away from autonomous access points towards what are called "light-weight" access points that are centrally controlled by, and work together with an entity in the wired network called a "WLAN controller" (WLC), or simply a controller. The AP functionality of the access point is managed by messages between the WLAN controller and the AP using a protocol called the Lightweight AP Protocol (LWAPP). There is an effort to standardize LWAPP in IETF as Control And Provisioning of Wireless Access Points (capwap). See for example www.capwap.org.

In addition to LWAPP, present-day lightweight mesh APs follow a multi-step process to form a tree topology for a wireless backhaul between mesh points, with one mesh point forming the root of the mesh tree topology. Each mesh point attempts to select a parent that provides a suitable path to the root of the tree topology. Once the tree topology is built, the parent as well as neighbors—potential parents—are then maintained on a periodic basis. One such well-known tree-building method is called Adaptive Wireless Path Protocol (AWPP). Tree forming, e.g., using AWPP, adds routing overhead to the network and also has some security implications.

SUMMARY

Described herein are aspects of route tree building for a wireless mesh network in which mesh points that are access points communicate with a controller using a lightweight access point protocol. While the description and claims refer to LWAPP, the invention is applicable to using any suitable lightweight access point protocol and any controller that uses the protocol, not only the LWAPP by Cisco Systems, Inc.

One embodiment includes a method in a controller of forming a tree topology for a wireless mesh network of mesh APs, wherein the AP functionality of each mesh AP is controlled by the controller using messages between each mesh AP and the controller uses a first protocol. The controller is connected to a root mesh AP that forms the root of the mesh network. The method includes receiving at the controller radio measurement reports from at least one mesh AP about neighbors of the at least one mesh APs. The method further includes determining the tree topology, including determining a potential parent AP and a selected parent AP to the parent of the potential parent AP. The method also includes sending a JOIN OFFER message to the potential parent AP and via the selected parent AP to offer the potential parent AP to join the mesh with the selected parent mesh AP as its parent, such that the selected parent mesh AP forms a secure link to the potential parent mesh AP, and relay the JOIN OFFER message to the potential parent mesh AP, such that the potential parent mesh AP can join the controller via the selected parent mesh AP.

In one embodiment of the method, the mesh network substantially conforms to the IEEE 802.11 standard, the first protocol substantially conforms to LWAPP, and the JOIN OFFER message is a new or modified LWAPP frame type.

One embodiment includes a method in a particular lightweight mesh AP that has a secure tunnel to a controller. The controller is configured for controlling the AP functionality of a set of lightweight APs including the particular mesh AP using messages between each lightweight mesh AP and the controller using a first protocol. The method includes (a): receiving one or more beacon and probe response frames from one or more neighboring APs. The method also includes (b): sending a radio measurement report to the controller, including information on the one or more neighboring APs. The method further includes (c): receiving from the controller a JOIN OFFER message to relay to a second mesh AP so that the second mesh AP can become a child mesh AP of the particular mesh AP, the JOIN OFFER frame sent by the controller as a result of the controller determining a tree topology, including determining the tree with the particular mesh AP a selected parent AP to the second mesh AP. The method further includes (d): relaying the JOIN OFFER message to the second mesh AP; and (e): receiving a JOIN REQUEST message from the second mesh AP as a result of the second mesh AP receiving the JOIN OFFER message to join the mesh, such that the second mesh AP joins the controller, including forming a secure tunnel to the controller.

One embodiment includes repeating (a) through (e) with one or more additional mesh APs. For example, initially the controller is coupled to a root mesh AP, steps (a) through (e) are first carried out at the root mesh AP, and steps (a) through (e) are repeated for other mesh APs to form a tree structure.

One embodiment includes a method in a particular lightweight AP that can be a mesh AP of a mesh network by joining the mesh via a parent mesh AP that has a secure tunnel to a controller and that is part of the wireless mesh network, the controller configured for controlling the AP functionality of a set of lightweight APs including the parent mesh AP using messages between each lightweight mesh AP and the controller using a first protocol. The method includes receiving a JOIN OFFER message from a first parent mesh AP, the JOIN OFFER message generated at the controller as a result of the controller carrying out a parent selection process. One version of the parent selection process includes the controller receiving radio measurement report from one or more mesh APs about neighboring APs to the one or more mesh APs, and the controller determining a tree topology, including determining the tree with the first parent mesh AP a selected parent AP to the particular mesh AP. The method further includes (b): joining the mesh network by joining the controller via the first parent mesh AP, including forming a secure tunnel to the controller.

One embodiment includes a computer-readable carrier medium carrying a set of instructions that when executed by one or more processors of a particular lightweight mesh AP cause the one or more processors to carry out a method in the particular lightweight mesh AP that has a secure tunnel to a controller. The controller is configured for controlling the AP functionality of a set of lightweight APs including the particular mesh AP using messages between each lightweight mesh AP and the controller using a first protocol. The method includes (a): receiving one or more beacon and probe response frames from one or more neighboring APs. The method also includes (b): sending a radio measurement report to the controller, including information on the one or more neighboring APs. In one embodiment, this includes radio measurements on both the access radio and on the backhaul radio. The method further includes (c): receiving from the controller a JOIN OFFER message to relay to a second mesh AP so that the second mesh AP can become a child mesh AP of the particular mesh AP, the JOIN OFFER frame sent by the controller as a result of the controller determining a tree topology, including determining the tree with the particular mesh AP a selected parent AP to the second mesh AP. The method further includes (d): relaying the JOIN OFFER message to the second mesh AP; and (e): receiving a JOIN REQUEST message from the second mesh AP as a result of the second mesh AP receiving the JOIN OFFER message to join the mesh, such that the second mesh AP joins the controller, including forming a secure tunnel to the controller.

In one embodiment, a computer-readable carrier medium carries a set of instructions that when executed by one or more processors of a controller cause the one or more processors to carry out a method in the controller of forming a tree topology for a wireless mesh network of mesh APs, wherein the AP functionality of each mesh AP is controlled by the controller using messages between each mesh AP and the controller uses a first protocol. The controller is connected to a root mesh AP that forms the root of the mesh network. The method includes receiving at the controller radio measurement reports from at least one mesh AP about neighbors of the at least one mesh APs. The method further includes determining the tree topology, including determining a potential parent AP and a selected parent AP to the parent of the potential parent AP. The method also includes sending a JOIN OFFER message to the potential parent AP and via the selected parent AP to offer the potential parent AP to join the mesh with the selected parent mesh AP as its parent, such that the selected parent mesh AP forms a secure link to the potential parent mesh AP, and relay the JOIN OFFER message to the potential parent mesh AP, such that the potential parent mesh AP can join the controller via the selected parent mesh AP.

Yet another aspect is a computer-readable carrier medium carrying a set of instructions that when executed by one or more processors of a particular lightweight mesh AP cause the one or more processors to carry out a method in the particular lightweight AP. The particular mesh AP is one that can be a mesh AP of a mesh network by joining the mesh via a parent mesh AP that has a secure tunnel to a controller and that is part of the wireless mesh network, the controller configured for controlling the AP functionality of a set of lightweight APs including the parent mesh AP using messages between each lightweight mesh AP and the controller using a first protocol. The method includes receiving a JOIN OFFER message from a first parent mesh AP, the JOIN OFFER message generated at the controller as a result of the controller carrying out a parent selection process. One version of the parent selection process includes the controller receiving radio measurement report from one or more mesh APs about neighboring APs to the one or more mesh APs, and the controller determining a tree topology, including determining the tree with the first parent mesh AP a selected parent AP to the particular mesh AP. The method further includes (b): joining the mesh network by joining the controller via the first parent mesh AP, including forming a secure tunnel to the controller.

One embodiment includes an apparatus in a controller for forming a tree topology for a wireless mesh network of mesh APs.

One embodiment includes an apparatus in a particular lightweight mesh AP that has a secure tunnel to a controller. The lightweight mesh AP becomes a parent mesh AP to a new lightweight mesh AP.

One embodiment includes an apparatus in a particular lightweight mesh AP. The lightweight mesh AP becomes a child mesh AP to an lightweight mesh AP that has a connection to a controller.

Other aspects, features, advantages will become apparent from the description herein and the claims.

DETAILED DESCRIPTION OF EXAMPLE EMBODIMENTS

Described herein is a route tree building method for a wireless mesh network that includes access points that are lightweight access points that communicate with a controller using a lightweight access point protocol. The method extends the existing lightweight access point protocol architecture, and includes using a centralized route calculation method based on wireless link metrics collected via neighbor reports.

Note that while the description and claims refer to LWAPP, the invention is applicable to using any suitable lightweight access point protocol and any controller that uses the protocol, not only the LWAPP by Cisco Systems, Inc.

Wireless Mesh Network

Figure 1:
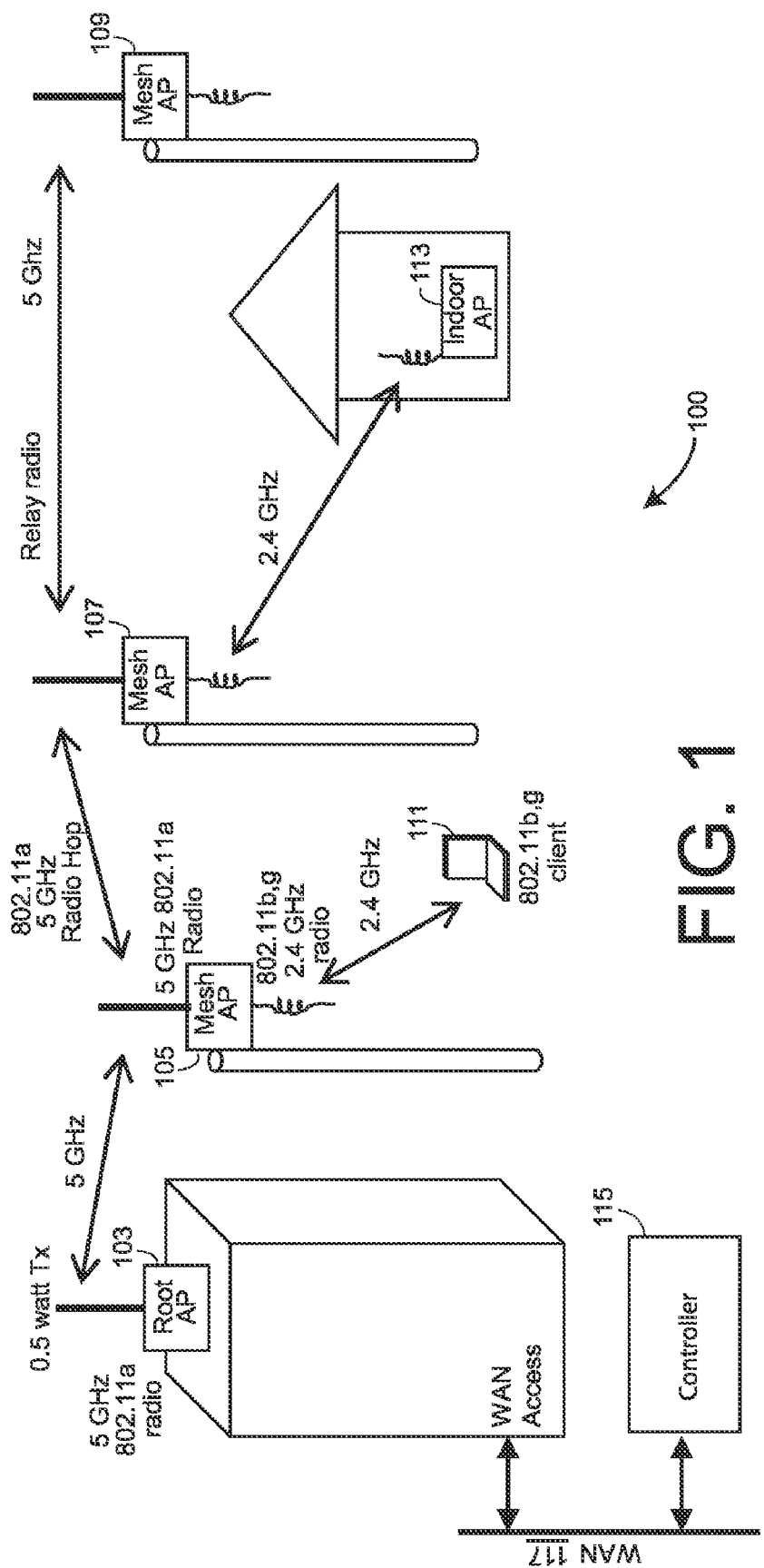
FIG. 1 shows an example wireless mesh network that includes two types of mesh points: a root access point (root AP) and mesh access points (mesh APs), and that also includes a controller. Aspects of the present invention operate to determine a route tree.

FIG. 1 shows an example wireless mesh network 100 that includes wireless mesh access points (APs) 103, 105, 107, and 109, e.g., for use outdoors. The access points 103, 105, 107, and 109 also each act as mesh points of a wireless mesh network, e.g., using an additional radio transceiver for the mesh backbone connection to route traffic between the mesh points, called mesh APs 103, 105, 107, and 109, to that used for the AP functionality. Such mesh access points may be used, for example, to cover large metropolitan areas. The example system uses the IEEE 802.11a standard for backhaul data transmission between the mesh points, and uses the IEEE 802.11b/g standard for client access. One client 111 of mesh AP 105 is shown. Also shown is an AP, e.g., an indoor AP 113 that connects via the 2.4 GHz link to mesh AP 107.

Aspects of the present invention are described operating in the example network of FIG. 1. While a network such as mesh network 100 may be prior art, a network such as mesh network 100 that operates according to aspects of the present invention is not prior art. Thus, no prior art designation is included.

As shown in FIG. 1, the example wireless mesh network 100 includes two types of mesh points: a root access point (root AP, RAP, root mesh AP) 103, shown here on the roof of a building, and a mesh access point (mesh AP, MAP) 105, 107, and 109 each shown here on a pole-top. Each of these also acts as an access point. A mesh point without the AP capability is simply called a mesh point, and in this description, mesh APs can act as mesh points when there are no client stations, or if the wireless AP capabilities are disabled.

The mesh access points 103, 105, 107, and 109 are "lightweight" access points whose AP functionalities are centrally controlled by, and work together with an entity 115 in the wired network called a "WLAN controller" (WLC), or simply a controller. The AP functionality of the access points is managed by messages between the WLAN controller and the AP using a protocol called the Lightweight AP Protocol (LWAPP). See for example, "Lightweight Access Point Protocol," Draft, IETF Working Group on Control And Provisioning of Wireless Access Points (capwap), available for download on Mar. 3, 2006 from URL <www3.ietf.org/proceedings/05nov/IDs/draft-ohara-capwap-lwapp-03.txt> and elsewhere. In that document, the lightweight AP is referred to as a wireless termination point (WTP). Those in the art will be familiar with the Lightweight Access Point Protocol, (LWAPP) as described in the above cited and readily available "capwap" IETF draft.

The WLAN controller 115 is coupled to the root AP 103 by a network, shown here as a wired wide area network (WAN) 117.

The mesh access points shown in FIG. 1 when coupled to the controller 115 in present-day implementations use a tree-based routing algorithm. A tree topology for a wireless backhaul between mesh points is built by root APs and mesh APs as they find each other and attempt to select a parent that provides a suitable path to the root of the tree topology, which in FIG. 1 is the root mesh AP 103 connected to the controller 115. Once the tree topology is built, the parents are then maintained on a periodic basis. One such well known tree-building method is called Adaptive Wireless Path Protocol (AWPP).

Thus, in a typical prior art system, in addition to LWAPP, mesh APs follow a multi-step process before they are able to join a controller, including discovering each other, forming the path to the root AP and mutually authenticating with each other such that there is a secure tunnel to the controller. The tree forming e.g., using AWPP, adds routing overhead to the network and also has some security implications.

mesh security includes link-level security—also called "IEEE 802.11" security, and "layer-2" security—for communication between a child mesh AP and a parent mesh AP, and tunnel security—also called "LWAPP tunnel" security—for communication between a child mesh AP and the controller 115 via a secure tunnel established using LWAPP. Details of security are included in "Lightweight Access Point Protocol," Draft, IETF Working Group on Control And Provisioning of Wireless Access Points (capwap), available for download on Mar. 3, 2006 from URL www3.ietf.org/proceedings/05nov/IDs/draft-ohara-capwap-lwapp-03.txt and elsewhere.

Note that existing tree-forming protocols, such as AWPP do not use LWAPP, but rather, the routes that form the tree topology are determined automatically by the mesh point nodes themselves.

The description herein assumes a wireless network that operates according to the IEEE 802.11 wireless local area network (WLAN) standard. The LWAPP protocol and the extension to the protocol described herein are however not restricted to such networks.

While in some network architectures, a separate mesh controlling entity, called a mesh controller, is used to control mesh network aspects, using LWAPP, in the description herein, a single entity, the controller (controller 115 in FIG. 1) performs all mesh control functions, so that the WLAN controller functions as well as the mesh controller functions are carried out in a single controller 115, shown coupled to the root AP 103 by a network 117.

In one embodiment an intrusion detection system is included and managed by the controller 115. The intrusion detection system is operative to detect rogue access points, and includes an exclusion data structure of blacklisted MAC addresses.

Recall that root access points such as root AP 103 are mesh APs that have a direct connection to the mesh controller, that in an embodiments described herein is the controller 115 that is part of a wired network, and that may further provide an uplink to other networks, e.g., the Internet, or some other wired network. Thus, as used herein, the root AP 103 is a mesh AP that has a network interface to the controller 115 in addition to a backhaul wireless interface to connect to other mesh points. The root AP 103 also can act as an access point, and for this can have a second wireless interface to connect with client stations, acting as the AP for these client stations. Note that FIG. 1 does not show such a second wireless interface to the root AP 103.

Thus, the root AP 103 has a direct LWAPP connection back to a controller 115 that manages the mesh network, e.g., to form the loop-free tree topology.

A root AP 103 uses its backhaul wireless interface to communicate to neighboring mesh APs 105, 107, and 109. Thus, root APs are the root nodes to any bridging or mesh network and connect a bridge or mesh network to the wired network. Root APs form the roots of any wireless mesh networks that have a tree topology.

As used herein, mesh APs are APs that are also mesh nodes. FIG. 1 shows mesh APs 105, 107, and 109. The architectures discussed herein are when the mesh nodes also are operative as lightweight APs. mesh APs 105, 107, and 109 are mesh points and APs that have no wired connection to a controller such as controller 115. A mesh AP 105, 107, 109 has a backhaul wireless interface to connect to other mesh points, shown here as an 802.11a 5 GHz radio interface. A mesh AP 105, 107, 109 has a second wireless interface, shown here as an 802.11b,g 2.4 GHz radio interface to connect with client stations, acting as an AP for the client stations. They can be completely wireless supporting clients, communicating to other mesh APs and root APs to access an external network, or as described in the following paragraph, a mesh AP can have a wire interface connectable to a wired network, and serve a bridging entity to a remote wired network.

Note that in one embodiment, some mesh APs can act as both a bridging entity, and as a routing entity. Each mesh point includes a memory, and maintains in the memory a forwarding data structure, e.g., a forwarding table that includes bridging information that shows/provides information on all entities directly connected to the entity, and routing information for how to route, e.g., to a parent or child of the tree of the mesh network. Each mesh AP also includes in its memory an adjacency data structure that maintains information on the tree, e.g., the MAC address of any parent, and of any children. Thus, in the case a mesh AP is also coupled to a wired network, when the mesh AP receives data from a child, it looks up its forwarding data structure by first looking up its bridging information. If the destination of the data is in a wired network connected to the mesh AP, the mesh AP's bridging information so indicates, and the mesh AP sends the information on. If not, the mesh AP looks up the routing information, and then sends the data frame on to its parent in the mesh tree topology.

Because mesh APs form point-to-point or point-to-multipoint connections, and additionally and simultaneously, act as an AP, a mesh AP typically includes at least two radio transceivers that can operate simultaneously, as described above.

Not shown in FIG. 1 are mesh points (MPs) that act as wireless bridging nodes, but that do not include the AP functionality. Such mesh points may be included in the network.

The mesh points, whether also access points, or only mesh points of a wireless mesh networks route traffic. Typically, the mesh points form a tree topology for routing traffic between these mesh points, with the mesh point that has a portal to the wired network forming the root of the tree. Aspects of the present invention describe forming the tree architecture. In the example network 100 shown in FIG. 1, the root AP 103 forms the root of the tree topology.

Architecture of a Wireless Mesh Node

One version of the methods described herein operate in a wireless mesh node that can act as either a mesh AP or a root AP, or indeed as simply a mesh point without the AP functionality. See, for example, the draft IEEE 802.11s standard. The operation is, for example, by executing software that resides in the wireless mesh node. One embodiment of the wireless mesh node includes two simultaneous operating radio transceivers. One of the radio transceivers operates the IEEE802.11b/g protocol (MAC and PHY) in the approximately 2.4 GHz band to allow wireless connections to 802.11b/g clients. The second radio transceiver operates the IEEE802.11a protocol in the approximately 5 GHz band to allow point-to-point (P2P) connections, point-to-multipoint (P2MP) connections, and connections between mesh points in a mesh, called the backhaul wireless connection, as described herein. Note that other embodiments use other frequency bands, and indeed, other embodiments operate under other standards other than the IEEE 802.11 standard. Furthermore, in some versions, more than two radios may be included. Furthermore, in a simple mesh point, a single radio transceiver may be included.

Figure 2:
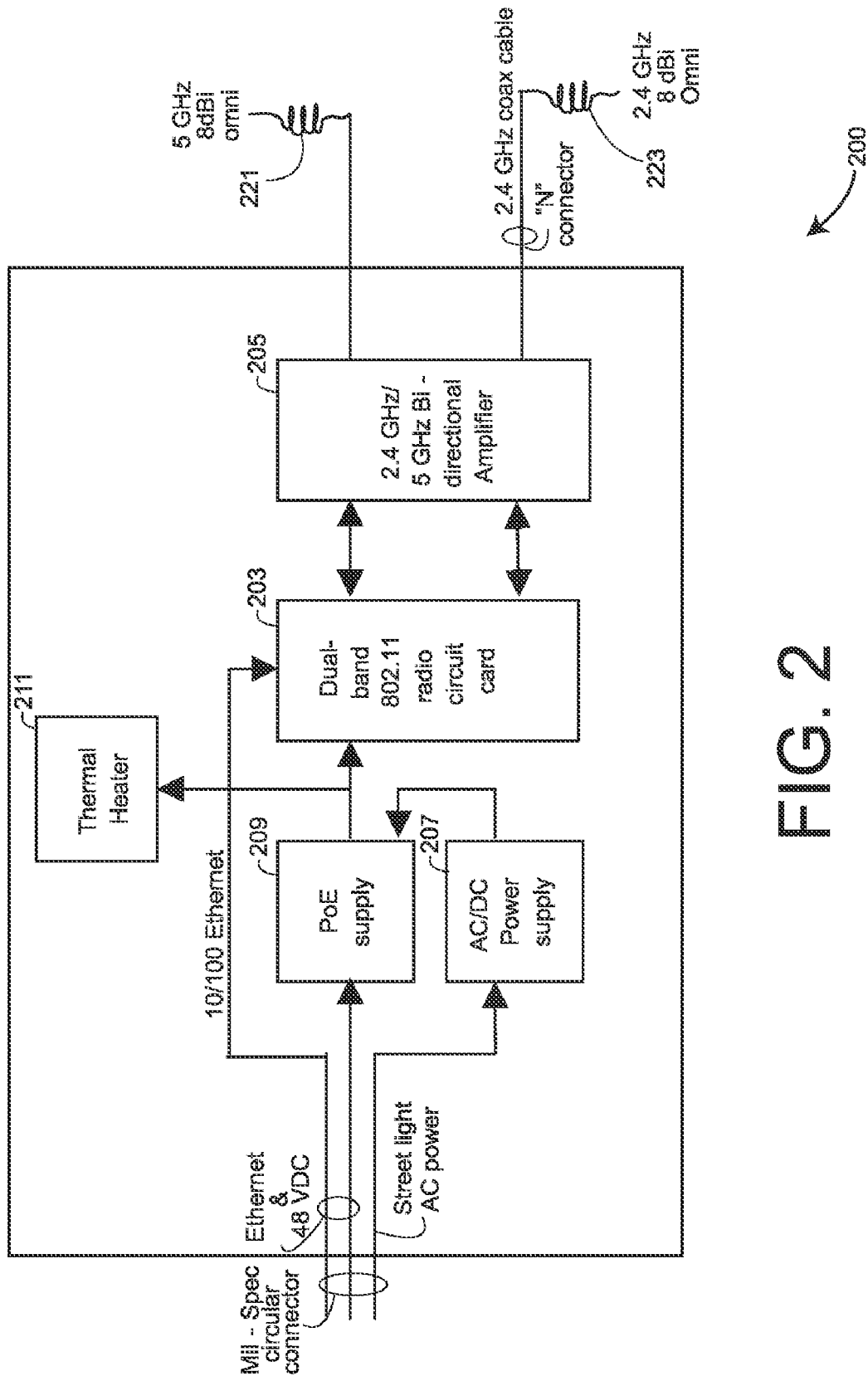
FIG. 2 shows a simplified block diagram of one embodiment of a mesh node that can act as a mesh AP, and in which aspects of the present invention can operate.

FIG. 2 shows a simplified block diagram of a dual-radio wireless node 200 used in one embodiment for mesh APs 105, 107, and 109, and for the root AP 103. While a wireless node such as wireless node 200 may be prior art, a wireless node such as wireless node 200 that includes software for operating according to one or more aspects of the present invention, is not prior art. Thus, no prior art designation is included. The wireless node 200 includes a dual-band radio circuit card 203, a bi-directional amplifier 205, a WLC power supply 207, a power-over-Ethernet (PoE) power supply 209, a thermal heater 211, and external connectors. One version of the wireless mesh node is powered from an extended range WLC power supply 207 accepting an input of 95 to 260 VAC. The wireless mesh node contains a ½-watt transmit amplifier in the 5 GHz band in 205, and sends the 5 GHz band signal out of a high gain omni-directional antenna 221. For operation as an access point (AP), the wireless mesh node contains a complete 2.4 GHz IEEE 802.11b/g radio with a high gain omni-directional antenna 223 to connect to IEEE802.11b/g clients. Note that typically, the 2.4 GHz band does not have enough bandwidth to allow four non-overlapping modulated transmitters. However, in one embodiment, a frequency reuse plan is adopted in this frequency band by overlapping adjacent channels to support a greater density of client users.

Figure 3:
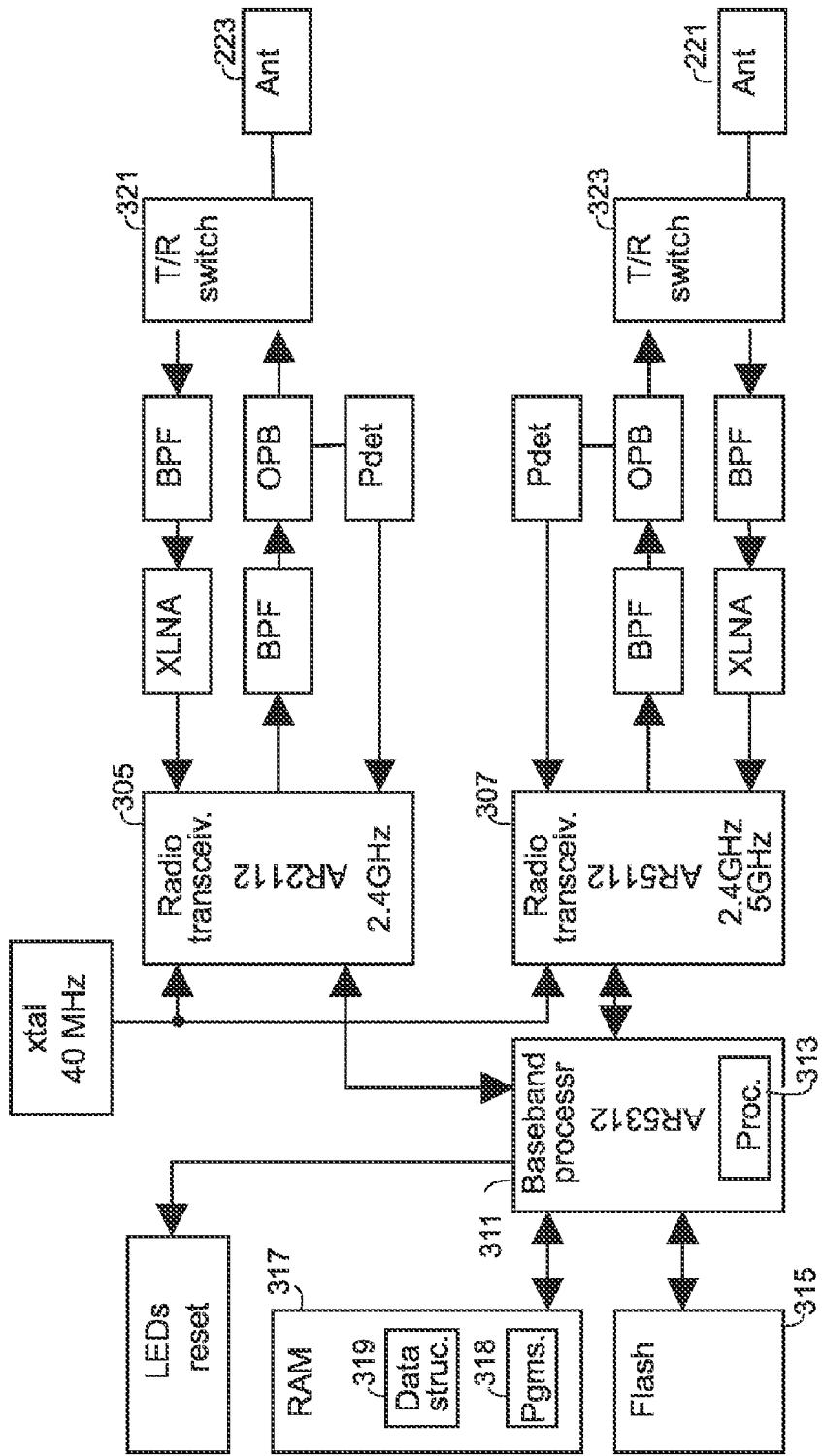
FIG. 3 shows a simplified block diagram of one embodiment of the dual-band radio circuit card of the mesh node of FIG. 2.

FIG. 3 shows a simplified block diagram of one embodiment of the dual-band radio circuit card 203 of the mesh node of FIG. 2. The dual-band radio circuit card 203 has both a 2.4 GHz 802.11b/g radio and a 5 GHz 802.11a radio. These radios can operate simultaneously. The circuit card includes a chip set by Atheros Communications (San Jose, Calif.). The radio front-end includes two transceiver integrated circuits, one an Atheros AR5112 integrated circuit 307 that can operate in both the 2.4 and the 5 GHz bands, and is used for the 5 GHz, and the second an Atheros AR2112 integrated circuit 305 that operates only in the 2.4 GHz band, and is used for the AP operations to connect to client stations. Each front-end transceiver 305, 307 is coupled to an Atheros AR5312 used as a baseband processor 311. The Atheros AR5312 contains a 220 MHz MIPs microprocessor, a SDRAM controller, a Flash controller, two IEEE 802.3 Ethernet MACs, a UART, a low speed UART, GPIO, two IEEE 802.11 MACs, and two IEEE 802.11 baseband PHYs, along with two sets of ADCs and DACs. The baseband processor AR5312 chip 311 is coupled to flash memory 315 that includes some factory settings, and to a memory—a RAM 317. The RAM 317 includes programs 318 in the form of instructions, that when executed by the processor 313 of the AR5312 chip 311 shown in the block marked Proc. to implement one or more aspects of the present invention that care carried out at a mesh AP or root AP.

The RAM 317 also stores some of the data structures 319 used to implement one or more aspects of the invention. The RAM 317 maintains the forwarding data structure in 319 that includes bridging information and routing information, and also the adjacency data structure in structures 319.

In one embodiment, one or more state machines are operative in the mesh AP. Depending on the role of the mesh AP, e.g., as a child mesh AP, a parent mesh AP, a root AP, different instances of the state machine may be instantiated, e.g., for each role. In one embodiment, the instantiations operate as software that when executed on the MIPS microprocessor 313 of the radio, execute the state machine instance. The software resides as instructions as part of the programs 318 in the memory 317.

Architecture of a Controller

Aspects of the present invention and of the lightweight access point protocol, e.g., LWAP, operate with a controller such as controller 115 that is coupled to the root AP. A Remote Authentication Dial-In User Service (RADIUS) server may be coupled to the controller 115. The RADIUS server acts as an authentication server (AS). Other servers such as a DNS server, A DHCP server and a wireless network control server may be present. There also may be more than one instance of any of these servers.

Figure 4:
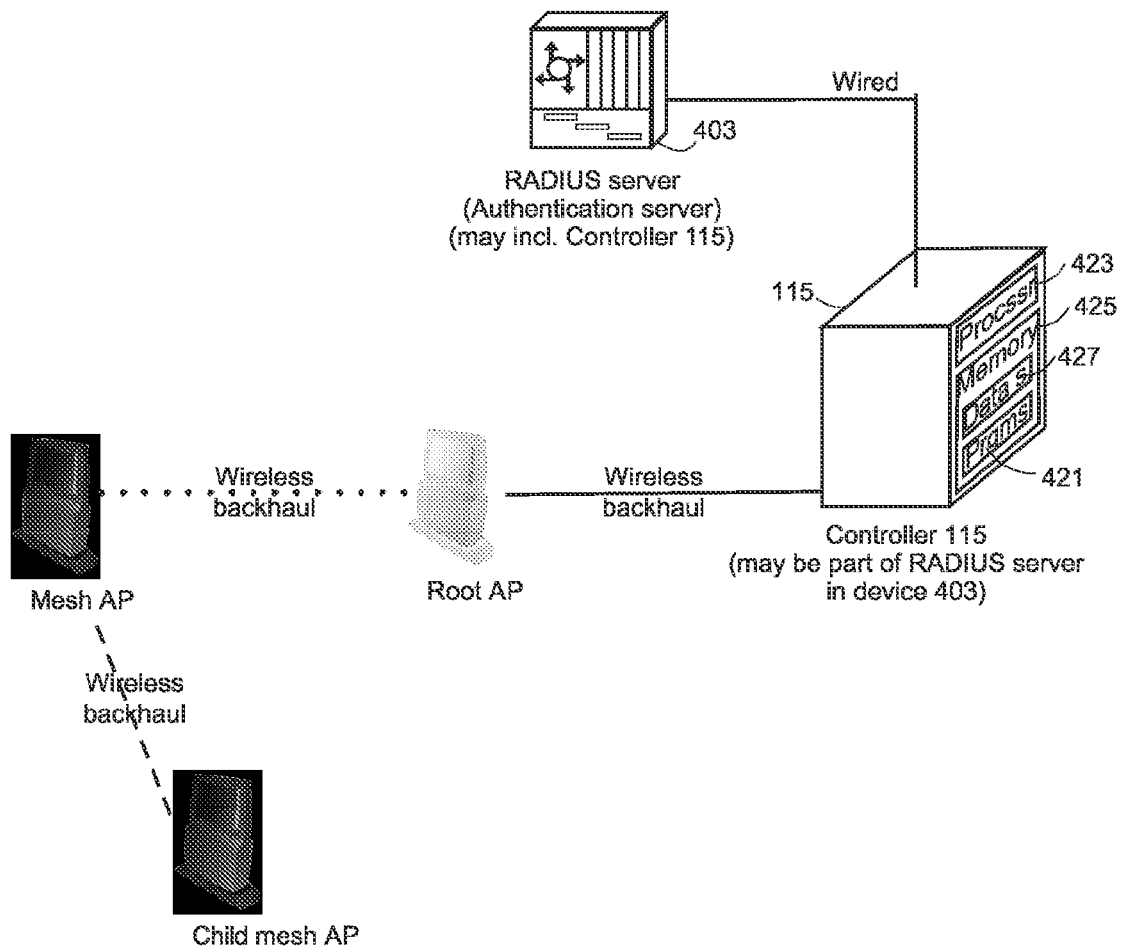
FIG. 4 shows a simplified block diagram of a mesh network, including some elements included in the controller in which aspects of the present invention can operate.

Note that FIG. 4 shows the controller 115 as a separate device in order to describe aspects of the invention functionally. Thus, in one embodiment, the controller 115 and an authentication server are in the same network device. Furthermore, the device incorporating controller 115 and RADIUS server may also perform other functions, e.g., network device 403 may act as a switch and may also act as a WLAN manager managing the setting of radio parameters.

Of course, in alternate embodiments, the controller 115 and authentication server are in separate devices, as would be understood by those in the art.

The coupling of the controller 115 to the root AP of a mesh may be direct, or via a network, e.g., network 117 of FIG. 1. In one embodiment, the coupling is via a fast network such as a Gigabit Ethernet.

FIG. 4 shows a simplified representation of the controller 115 in order to show some of the elements of the device. In one embodiment, the controller 115 includes a controller processing system that has a controller host processor 423 and a controller memory 425 coupled to the controller processor 423 via a bus subsystem (not shown). Some aspects of the present invention are in the form of software, i.e., computer readable instructions 421 that when executed by the controller processor 423 carry out one or more steps of a method embodiment of the invention. Thus, aspects of the invention are in the form of instructions 421 carried in a carrier medium, e.g., memory 425.

Some aspects of the invention are managed by one or more state machines operative in the controller 115 that are implemented by the form of software (instructions), also shown as instructions 421 in memory 425, that when executed on the controller host processor 423 cause the processor to implement the state machine(s). One such state machine is an LWAPP state machine that runs aspects of the LWAPP protocol, including the tree forming aspects described herein.

Several data structures 427 are used in the controller 115 carrying out its function. In one embodiment, such data structures 427 are maintained in the processing system, e.g., in the memory 425 coupled to the controller host processor 423.

In one embodiment an intrusion detection system is included and managed by the controller 115. The intrusion detection system is operative to detect rogue access points, and includes an exclusion data structure of blacklisted MAC addresses. The exclusion data structure is included in the data structures 427 shown in memory 425.

Those in the art will understand that the controller processing system in controller 115 may include a storage subsystem that has one or more storage devices such as one or more hard disks. While instructions 421 and data structures 427 are shown in memory 425, those in the art will understand that all of the instructions 421 and/or all of the data structures 427 may not be in the memory at the same time, but that rather, in general, there is a carrier medium that carries the instructions, and that carries the data structures, and that such carrier medium in one embodiment is the storage subsystem in combination with the memory.

Forming the Route Tree

By "Radio Resource Management" (RRM) is meant a protocol for wireless nodes of a wireless network, e.g., for APs and client stations to perform passive and active scanning for beacons and probe responses, that is, to receive and collect data on beacon frames and probe response frames that are transmitted by nearby nodes, so that the receiving nodes can collect and report such parameters as their transmit power, e.g., for determining the path loss in a link, the received signal strength, the bit error rate (BER) or packet error rate (PER) on a link, noise, interference, signal-to-noise ratio (SNR), signal-to-interference-noise radio (SINR), load, admission capacity, and so forth. RRM protocols exist that include frames called measurement frames to direct on or more nodes to send what are called measurement report frames herein. Such protocols include Cisco Compatible Extensions (CCX), from Cisco Systems, Inc., San Jose, Calif., related to the assignee of the present invention, and the soon to be ratified IEEE 802.11k draft standard for WLAN Radio Resource Management. See, for example, "Cisco Compatible Extension: Versions and Features, available for download Aug. 1, 2006, at www.cisco.com/warp/public/765/ccx/versions_and_features.shtml.

Controllers for lightweight APs made by Cisco Systems, Inc., include RRM functionality, and controller 115 and all access points and client stations are assumed to include the functionality, including accurate measurement of one or more parameters that are used to determine link metrics, including at least accurate measurement of the RSSI, and relatively accurate calibration of the transmitter so that there is knowledge of the transmit power.

Figure 5:
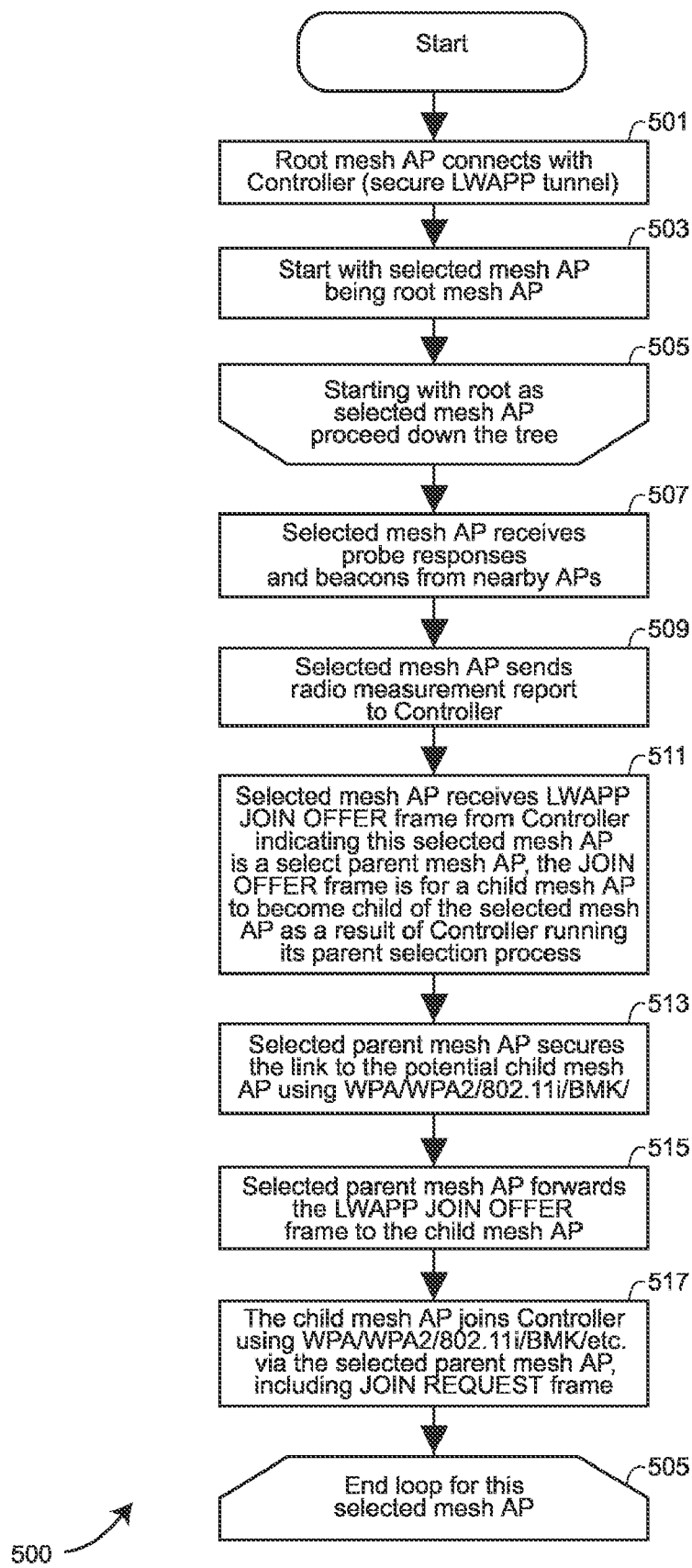
FIG. 5 shows a simplified flowchart of one embodiment of a method of building the route tree amongst a set of mesh APs using one or more aspects of the present invention.

FIG. 5 shows a simplified flowchart 500 of one embodiment of a method of building the route tree amongst a set of mesh APs. In the description herein, it is assumed that a root mesh AP joins a controller, e.g., controller 115 using LWAPP as soon as it discovers itself as a root AP. This is shown in 501 in FIG. 5. In one embodiment, joining the controller includes forming a secure tunnel with the controller. The flowchart includes 507 to 517 that are in a loop 505 that is repeated for each selected mesh AP, starting (shown as 503) with the root AP as the selected mesh AP. The controller has a parent selection process as part of a tree building process that determines which mesh APs are to be a selected child mesh AP to the selected mesh AP as a selected parent mesh AP, so that these child mesh APs can themselves become parent mesh APs in the tree topology, proceeds to invite each new child to join, via the selected parent mesh AP. Once a wireless node joins the mesh as a child mesh AP, it becomes a potential selected parent mesh AP so that another wireless node can become its child as a result of the selected mesh AP sending the controller reports of probe responses and beacon frames received from neighboring APs. Therefore, referring to FIG. 5, starting with the selected mesh AP being the root mesh AP, the process proceeds as follows for each such selected mesh AP.

In 507, the selected mesh AP, initially the root AP, discovers and makes RRM measurements on the frames, e.g., probe response and beacon frames it receives directly from nearby mesh APs. The mesh AP wait for a settable amount of time, indicated by a settable parameter called NEIGHBOR_DISCOVERY_TIME herein, before in 509 forwarding a radio measurement frame called a RRM Neighbor Report frame herein, to the controller 115. In one embodiment, the RRM Neighbor Report is compatible to Cisco's CCX. In another embodiment, it is compatible to the draft IEEE 802.11k standard. In all embodiments, the RRM Neighbor Report includes link metrics, including one or more of BER/PER, SNR, RSSI, etc. for a wireless link from another node the mesh AP can receive from—a neighbor, as well as one or more other neighbor information such a set of radio and antenna parameters, e.g., transmit power, number of antennas, and so forth. In one embodiment, this include reports on radio measurements on both the access radio and on the backhaul radio.

The controller 115 receives such RRM Neighbor Reports frames, and runs a parent selection method for tree building. Initially the parent selection method determines which mesh APs can use the root AP as the parent and themselves become a parent. In later iterations, when the mesh AP sending the RRM Neighbor report is other than the root mesh AP, the parent selection method at the controller determines which mesh APs can use the selected mesh AP as the selected parent mesh AP to themselves become a parent, and each such mesh APs become a potential child mesh AP of the selected mesh AP. The controller 115 sends out an LWAPP frame called an LWAPP JOIN OFFER frame herein to the selected potential child mesh APs via the parent mesh AP. In one embodiment, an LWAPP JOIN OFFER frame includes the mesh AP, selected parent of the mesh AP, parent channel band, the channel, and other pertinent information. In one embodiment, the LWAPP JOIN OFFER frame has similar form, and is an extended version of an LWAPP JOIN REQUEST frame as used in standard LWAPP. For standard LWAPP, see for example www.capwap.org.

In 511, the selected mesh AP receives the LWAPP JOIN OFFER for the potential child mesh AP.

In 513, the selected mesh AP secures the IEEE 802.11 link to the potential child mesh AP using a security mechanism, e.g., WPA, or WPA2, or IEEE 802.11i, or the Bridge Master Key, or some other security mechanism. Link-level security—also called "IEEE 802.11" security and "layer-2" security—is for communication between a child mesh AP and a parent mesh AP, and is part of mesh network security.

Once the parent to child link is secured, in 515, the LWAPP JOIN OFFER frame is relayed by the selected mesh AP to the potential child mesh AP.

In an alternate embodiment, the LWAPP JOIN OFFER frame includes not only the selected parent to the potential child, but also one or more other potential parents, e.g., in the form of MAC addresses, each such alternate parent providing an alternative path to the root mesh AP. In one embodiment, each mesh AP includes a local data structures that includes potential parents for future use in case of link failure to the present parent mesh AP, and each mesh receiving an LWAPP JOIN OFFER frame stores potential patents in its local data structure for future use in case of link failure.

In 517, the potential child mesh AP that received the LWAPP JOIN OFFER joins the controller using WPA/WPA2/802.11i/BMK/etc. to form a secure LWAPP tunnel to the controller via the selected parent mesh AP, which is at first the root AP. This includes an LWAPP JOIN frame exchange with the controller 115 via the selected parent mesh AP in the LWAPP JOIN OFFER. Thus the potential child mesh AP sets the selected parent mesh AP as its parent. Once a secure LWAPP tunnel to the controller is established, the new child mesh AP start relaying wireless client data frames.

This new child mesh AP is now a potential parent AP for the tree. Therefore, it, and each joined mesh AP then follow 507 through 517 of the flow chart of FIG. 5, including receiving frames such as beacon and probe response frames from neighboring APs, and then sending RRM Neighbor Reports to the controller 115 so that the controller can run its parent selection process. In this way, the tree topology is built away from the root mesh AP.

Note that in one embodiment, no data frames are exchanged prior to the link to the new child mesh AP being secured. This, for example, is needed to maintain compatibility with WPA2.

Figure 6:
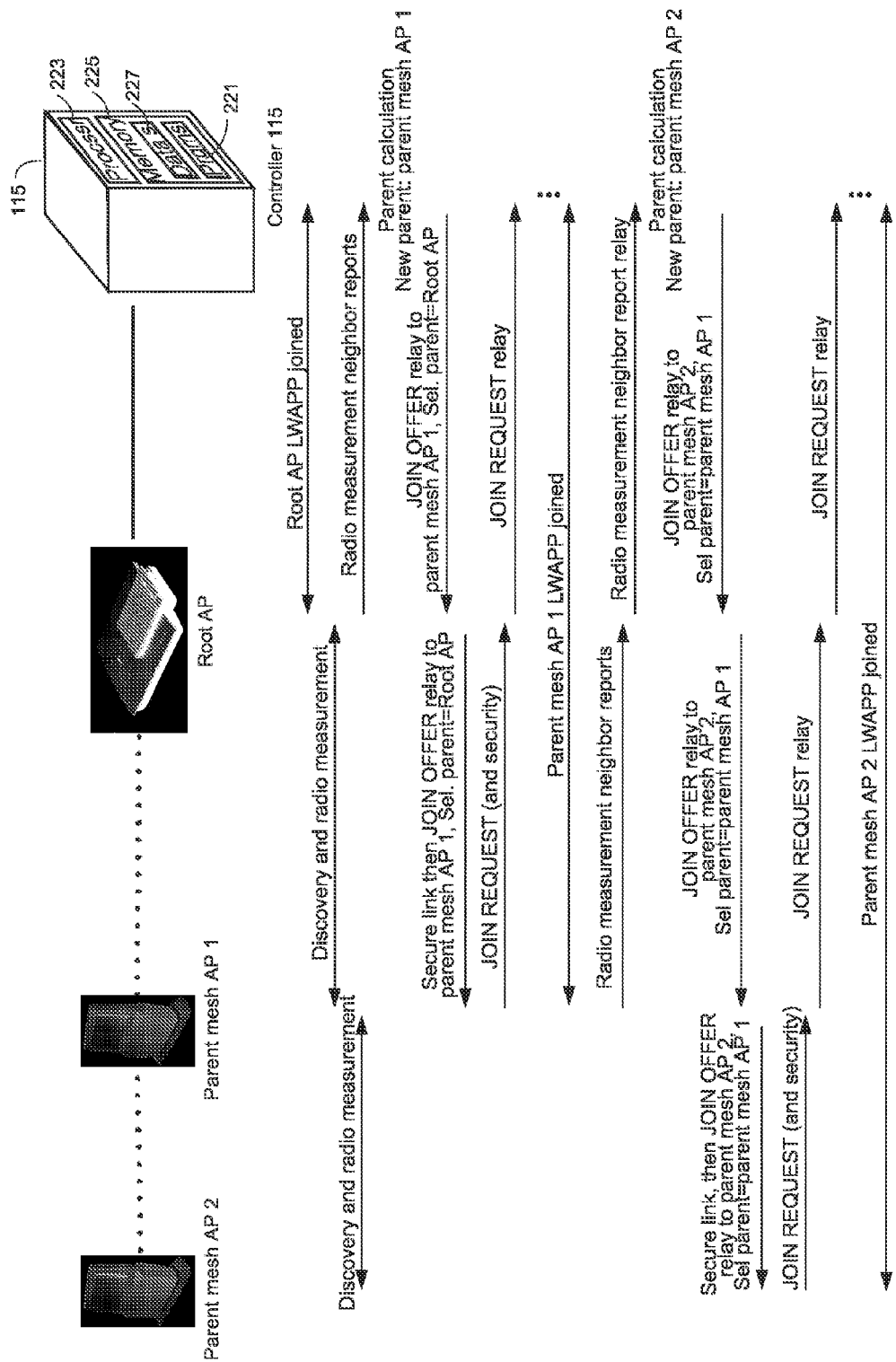
FIG. 6 shows communication between entities in a simple example of one embodiment of the LWAPP route tree building method.

FIG. 6 shows a simple example of the LWAPP route tree building method. Shows are a sequence of messages between entities after the root AP joins the controller. The controller is shown receiving RRM Neighbor Reports and calculating a new selected parent mesh AP. Initially the root AP is the selected parent mesh AP. A JOIN OFFER FRAME is sent to parent mesh AP 1 to become a child mesh AP of the selected parent mesh AP. The root AP secures the L2 link to parent mesh AP 1 and relays the JOIN OFFER frame to parent mesh AP 1. The parent mesh AP 1 now forms a secure LWAPP tunnel to the controller including a JOIN REQUEST exchange. After that, data can come to the controller via parent mesh AP 1. The controller is now shown receiving RRM neighbor reports from parent mesh AP 1. Note the controller receives RRM neighbor reports from other mesh APs as well. The controller's parent selection process selects parent mesh AP 1 as the selected parent and parent mesh AP 2 as the child mesh AP to that selected parent by sending a JOIN OFFER frame to parent mesh AP 2 via parent mesh AP 1 (and via the root AP to reach parent mesh AP 1). Parent mesh AP 1 secures the L2 link to parent mesh AP 2 and relays the JOIN OFFER to parent mesh AP 2. The parent mesh AP 2 now forms a secure LWAPP tunnel to the controller including a JOIN REQUEST. After that, data can come to the controller via parent mesh AP 2.

In one embodiment, whenever a mesh AP receives an LWAPP JOIN OFFER frame with a different selected parent mesh AP that the mesh AP's current parent, the mesh AP leaves the current parent and undergoes a secure roam, via a secure LWAPP roam process to be connected via new selected parent. This includes establishing a secure IEEE 802.11 (L2) link to the new parent mesh AP, and then forming the secure LWAPP tunnel to the controller. In the case that a mesh AP loses a parent and there is no potential other parent, in one embodiment, the mesh AP waits for the next LWAPP JOIN OFFER frame from the controller 115. The controller 115 should discover the link loss within a period of time, determine the affected mesh APs, and send out LWAPP JOIN OFFER frames to such mesh APs via new selected parents.

The method described herein does not depend on any particular Parent Selection Method for selecting new parents for the tree topology. One embodiment operates as follows. As the controller 115 receives a "RRM Neighbor Report" from mesh APs, the controller builds a tree topology rooted at the root AP and calculates a cumulative metric for each branch of the tree terminating at a mesh AP. Different embodiments use different tree branch metrics. One version uses a flexible tree branch metric that uses one or more of the available RRM link measurements, such as BER/PER, noise, interference, load, admission capacity, and so forth. One embodiment further uses one or more link properties such as data rate; and one ore more node properties, such as hop count.

The route tree topology is maintained at the controller 115 in a memory data structure via RRM Neighbor Reports that are received from mesh APs and processed by the controller 115. Any changed to the maintained tree topology are send to the affected mesh APs, e.g., in the form of LWAPP JOIN OFFER frame.

In one embodiment, whenever a mesh AP appears in multiple RRM reports, the Parent Selection Method only keeps the best branch and saves all others as backups. It employs a hysteresis into path building so that LWAPP JOIN OFFER frames are sent out with a selected a relatively small number of times to the mesh APs.

In one embodiment, the Parent Selection Method uses a heartbeat mechanism to detect link failure between mesh APs. In another embodiment, a different method is used to detect link failure.

In one embodiment, whenever a mesh AP loses its parent, or in the case that mesh AP does not receive a JOIN-OFFER for a pre-defined period of time, the mesh AP runs a local tree building method, e.g., AWPP to possibly connect to the mesh. As soon as a controller connection is established or re-established, a selected parent mesh AP may be selected for that mesh AP according to the parent selection method described herein. In such a case, the controller selected parent mesh AP overrides the locally selected parent. Such an embodiment prevents a mesh AP from waiting too long for the next JOIN-OFFER to arrive, and further deals with failed parent-child connection faster than only depending on a globally determined tree-building method. In on embodiment of the controller-based parent selection method once such a mesh AP (re)joins the mesh using a locally selected parent, the controller-based parent selection method accepts this changed input and adjust the network as necessary accordingly.

In one embodiment the controller-based parent selection method described herein determines and sends out information on a plurality of alternate/backup neighbors as potential parents so that there are potential parent mesh APs available in case of current parent loss. One version of the controller-based parent selection method use a heartbeat mechanism that includes a so-called heartbeat message being sent and received to know aliveness, and another embodiment of the controller-based parent selection method uses a parent that reports link-loss to make sure that the controller-based parent selection method continues to have a global view of the network and optimize all links. In presence of fresh alternate/backup neighbors, recovery from a failover occurs more rapidly than in the case of a mesh AP attempting to re-discover neighbors by running exhaustive channel scan.

In yet another embodiment, a local tree-building method is run on startup by each mesh AP. After a mesh AP joins the controller by forming the secure tunnel to the controller, the controller provides the just-joined mesh AP with a selected parent AP in a JOIN-RESPONSE frame based on the parent section method described herein. This method can take advantage of the quick convergence achieved by a distributed, local mesh routing protocol, such as AWPP.

Thus has been described a method of forming a tree topology that uses LWAPP messages and that includes a parent selection method operating at a controller.

One aspect of the method provides for determining a tree structure without necessarily requiring mesh APs to locally carry out route calculations. One aspect of the method further is able to assure that all mesh APs are always connected to their respective selected parent as determined by the parent selection method. One embodiment of the method further leverages existing LWAPP architecture and extends LWAPP suitably to work in mesh networks. One aspect of the method provides centralized route calculations for a scalable route tree that builds out mesh paths from already trusted and established links. This method takes advantage of global mesh view from central locations, such as controllers helping implementing such techniques as load balancing, traffic engineering and fast reroute and help build very large metropolitan wireless mesh networks.

One embodiment further includes graphically displaying the determined route tree on a management platform that is coupled to the controller.

While embodiments described herein use LWAPP as the protocol between the controller and mesh APs to control the AP functionality of each mesh AP, the invention is not restricted to using LWAPP. Alternate embodiments can use any other protocol between each mesh AP and the controller to control AP functionality, and such other protocol may have different associated frame structures.

Furthermore, while in embodiments described herein, a JOIN OFFER message is in the form of a frame that substantially conforms to the protocol used between each mesh AP and the controller to control AP functionality, e.g., LWAPP, other embodiments use a different form for the JOIN OFFER.

Furthermore, then mentioning local tree-topology building methods, those in the art will understand that the inventive method is not restricted to any particular building method, e.g., not restricted to the AWPP method described herein.

The methodologies described herein are, in one embodiment, performable by a machine which includes a one or more processors that accept code segments containing instructions. For any of the methods described herein, when the instructions are executed by the machine, the machine performs the method. Any machine capable of executing a set of instructions (sequential or otherwise) that specify actions to be taken by that machine are included. Thus, a typical machine may be exemplified by a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. If the processing system requires a display, such a display may be included, e.g., a liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The term memory unit as used herein also encompasses a storage system such as a disk drive unit. The processing system in some configurations may include a sounds output device, and a network interface device. The memory subsystem thus includes a carrier medium that carries machine readable code segments, (e.g., software) including instructions for performing, when executed by the processing system, one of more of the methods described herein. The software may reside in the hard disk, or may also reside, completely or at least partially, within the RAM and/or within the processor during execution thereof by the computer system. Thus, the memory and the processor also constitute carrier medium carrying machine readable code.

In alternative embodiments, the machine operates as a standalone device or may be connected, e.g., networked to other machines, in a networked deployment, the machine may operate in the capacity of a server or a client machine in server-client network environment, or as a peer machine in a peer-to-peer or distributed network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine.

Note that while some diagram(s) only show(s) a single processor and a single memory that carries the code, those in the art will understand that many of the components described above are included, but not explicitly shown or described in order not to obscure the inventive aspects. For example, while only a single machine is illustrated, the term "machine" shall also be taken to include any collection of machines that individually or jointly execute a set (or multiple sets) of instructions to perform any one or more of the methodologies discussed herein.

Thus, one embodiment of each of the methods described herein is in the form of a computer program that executes on a processing system, e.g., a one or more processors that are part of wireless mesh point, or, in another embodiments, as part of a controller Thus, as will be appreciated by those skilled in the art, embodiments of the present invention may be embodied as a method, an apparatus such as a special purpose apparatus, an apparatus such as a data processing system, or a carrier medium, e.g., a computer program product. The carrier medium carries one or more computer readable code segments for controlling a processing system to implement a method. Accordingly, aspects of the present invention may take the form of a method, an entirely hardware embodiment, an entirely software embodiment or an embodiment combining software and hardware aspects. Furthermore, the present invention may take the form of carrier medium, e.g., a computer program product on a computer-readable storage medium carrying computer-readable program code segments embodied in the medium. Embodiments of the invention are in the form of logic encoded in one or more tangible media for execution and when executed operable to implement a method as described herein.

The software may further be transmitted or received over a network via the network interface device. While the carrier medium is shown in an example embodiment to be a single medium, the term "carrier medium" should be taken to include a single medium or multiple media, e.g., a centralized or distributed database, and/or associated caches and servers that store the one or more sets of instructions. The term "carrier medium" shall also be taken to include any medium that is capable of storing, encoding or carrying a set of instructions for execution by the machine and that cause the machine to perform any one or more of the methodologies of the present invention. A carrier medium may take many forms, including but not limited to, non-volatile media, volatile media, and transmission media. Non-volatile media includes, for example, optical, magnetic disks, and magneto-optical disks. Volatile media includes dynamic memory, such as main memory. Transmission media includes coaxial cables, copper wire and fiber optics, including the wires that comprise a bus subsystem. Transmission media also may also take the form of acoustic or light waves, such as those generated during radio wave and infrared data communications. For example, the term "carrier medium" shall accordingly be taken to include, but not be limited to, solid-state memories, optical and magnetic media, and carrier wave signals.

It will be understood that the steps of methods discussed are performed in one embodiment by an appropriate processor (or processors) of a processing (i.e., computer) system executing instructions (code segments) stored in storage. It will also be understood that the invention is not limited to any particular implementation or programming technique and that the invention may be implemented using any appropriate techniques for implementing the functionality described herein. The invention is not limited to any particular programming language or operating system.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner, as would be apparent to one of ordinary skill in the art from this disclosure, in one or more embodiments.

Similarly, it should be appreciated that in the above description of example embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

It should be appreciated that although the invention has been described in the context of the IEEE 802.11 standard, the invention is not limited to such contexts and may be utilized in various wireless network applications and systems, for example in a system that uses packets other than IEEE 802.11 packets, or in a network that conforms to a standard other than IEEE 802.11. Furthermore, the invention is not limited to any one type of architecture or protocol, and thus, may be utilized in conjunction with one or a combination of other architectures/protocols. For example, the invention may be embodied in transceivers conforming to other standards and for other applications, including other WLAN standards, WiMAX, and other wireless standards. Furthermore, while the invention has been presented with light access point connectable to a controller, the invention can also be implemented in other mesh wireless networks that require secure communication with a central controller.

All publications, patents, and patent applications cited herein are hereby incorporated by reference.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

Similarly, it is to be noticed that the term coupled, when used in the claims, should not be interpreted as being limitative to direct connections only. Thus, the scope of the expression a device A coupled to a device B should not be limited to devices or systems wherein an output of device A is directly connected to an input of device B. It means that there exists a path between an output of A and an input of B which may be a path including other devices or means.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

In keeping with common industry terminology, the terms "base station", "access point", and "AP" may be used interchangeably herein to describe an electronic device that may communicate wirelessly and substantially simultaneously with multiple other electronic devices, while the terms "client," "mobile device" and "STA" may be used interchangeably to describe any of those multiple other electronic devices, which may have the capability to be moved and still communicate, though movement is not a requirement. However, the scope of the invention is not limited to devices that are labeled with those terms.

While an embodiment has been described for operation in an OFDM receiver with RF frequencies in the 5 GHz range and 2.4 GHz range (the 802.11a and 802.11g variants of the IEEE 802.11 standard), the invention may be embodied in receivers and transceivers operating in other RF frequency ranges. Furthermore, while a transceiver embodiment for operation conforming to the IEEE 802.11 OFDM standards has been described, the invention may be embodied in transceivers conforming to other standards and for other applications, including, for example other WLAN standards and other wireless standards. Applications that can be accommodated include IEEE 802.11a COFDM wireless LANs and links, wireless Ethernet, HIPERLAN 2, European Technical Standards Institute (ETSI) broadband radio access network (BRAN), and multimedia mobile access communication (MMAC) systems, wireless local area networks, local multipoint distribution service (LMDS) IF strips, wireless digital video, wireless USB links, wireless IEEE 1394 links, TDMA packet radios, low-cost point-to-point links, voice-over-IP portable "cell phones" (wireless Internet telephones), etc.

In the context of this document, the term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not.

Unless specifically stated otherwise, as apparent from the following discussions, it is appreciated that throughout the specification discussions utilizing terms such as "processing," "computing," "calculating," "determining" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

The methodologies described herein are, in one embodiment, performable by one or more processors that accept computer-readable (also called machine-readable) code containing a set of instructions that when executed by one or more of the processors carry out at least one of the methods described herein. Any processor capable of executing a set of instructions (sequential or otherwise) that specify actions to be taken are included. Thus, one example is a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. The processing system further may be a distributed processing system with processors coupled by a network. If the processing system requires a display, such a display may be included, e.g., a liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The term memory unit as used herein, if clear from the context and unless explicitly stated otherwise, also encompasses a storage system such as a disk drive unit. The processing system in some configurations may include a sound output device, and a network interface device. The memory subsystem thus includes a computer-readable carrier medium that carries computer-readable code (e.g., software) including a set of instructions to cause performing, when executed by one or more processors, one of more of the methods described herein. Note that when the method includes several elements, e.g., several steps, no ordering of such elements is implied, unless specifically stated. The software may reside in the hard disk, or may also reside, completely or at least partially, within the RAM and/or within the processor during execution thereof by the computer system. Thus, the memory and the processor also constitute computer-readable carrier medium carrying computer-readable code.

Furthermore, a computer-readable carrier medium may form, or be includes in a computer program product.

In alternative embodiments, the one or more processors operate as a standalone device or may be connected, e.g., networked to other processor(s), in a networked deployment, the one or more processors may operate in the capacity of a server or a client machine in server-client network environment, or as a peer machine in a peer-to-peer or distributed network environment. The one or more processors may form a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine.

Note that while some diagram(s) only show(s) a single processor and a single memory that carries the computer-readable code, those in the art will understand that many of the components described above are included, but not explicitly shown or described in order not to obscure the inventive aspect. For example, while only a single machine is illustrated, the term "machine" shall also be taken to include any collection of machines that individually or jointly execute a set (or multiple sets) of instructions to perform any one or more of the methodologies discussed herein.

Thus, one embodiment of each of the methods described herein is in the form of a computer-readable carrier medium carrying a set of instructions, e.g., a computer program that are for execution on one or more processors, e.g., one or more processors that are part of a controller, or as a different aspect, one or more processors that are part of a wireless node acting as a mesh AP. Thus, as will be appreciated by those skilled in the art, embodiments of the present invention may be embodied as a method, an apparatus such as a special purpose apparatus, an apparatus such as a data processing system, or a computer-readable carrier medium, e.g., a computer program product. The computer-readable carrier medium carries computer readable code including a set of instructions that when executed on one or more processors cause the processor or processors to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code embodied in the medium.

The software may further be transmitted or received over a network via a network interface device. While the carrier medium is shown in an example embodiment to be a single medium, the term "carrier medium" should be taken to include a single medium or multiple media (e.g., a centralized or distributed database, and/or associated caches and servers) that store the one or more sets of instructions. The term "carrier medium" shall also be taken to include any medium that is capable of storing, encoding or carrying a set of instructions for execution by one or more of the processors and that cause the one or more processors to perform any one or more of the methodologies of the present invention. A carrier medium may take many forms, including but not limited to, non-volatile media, volatile media, and transmission media. Non-volatile media includes, for example, optical, magnetic disks, and magneto-optical disks. Volatile media includes dynamic memory, such as main memory. Transmission media includes coaxial cables, copper wire and fiber optics, including the wires that comprise a bus subsystem. Transmission media also may also take the form of acoustic or light waves, such as those generated during radio wave and infrared data communications. For example, the term "carrier medium" shall accordingly be taken to included, but not be limited to, solid-state memories, a computer product embodied in optical and magnetic media, a medium bearing a propagated signal detectable by at least one processor of one or more processors and representing a set of instructions that when executed implement a method, a carrier wave bearing a propagated signal detectable by at least one processor of the one or more processors and representing the set of instructions a propagated signal and representing the set of instructions, and a transmission medium in a network bearing a propagated signal detectable by at least one processor of the one or more processors and representing the set of instructions.

It will be understood that the steps of methods discussed are performed in one embodiment by an appropriate processor (or processors) of a processing (i.e., computer) system executing instructions (computer-readable code) stored in storage. It will also be understood that the invention is not limited to any particular implementation or programming technique and that the invention may be implemented using any appropriate techniques for implementing the functionality described herein. The invention is not limited to any particular programming language or operating system.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the above description of example embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

All publications, patents, and patent applications cited herein are hereby incorporated by reference.

Any discussion of prior art in this specification should in no way be considered an admission that such prior art is widely known, is publicly known, or forms part of the general knowledge in the field.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

Similarly, it is to be noticed that the term coupled, when used in the claims, should not be interpreted as being limitative to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

I claim:

1. A method of operating a controller comprising: receiving at a controller radio measurement reports from at least one mesh access point about neighbors of the at least one mesh access points, the mesh access points being mesh points of a wireless mesh network, wherein the access point functionality of each mesh access point is controlled by the controller using messages between each mesh access point and the controller using a first protocol, the controller connected to a root mesh access point that forms the root of the mesh network; determining a tree topology for the wireless mesh network, including determining a potential parent access point and a selected parent access point to the parent of the potential parent access point; and sending a JOIN OFFER message to the potential parent access point and via the selected parent access point to offer the potential parent access point to join the mesh with the selected parent mesh access point as its parent, such that the selected parent mesh access point forms a secure link to the potential parent mesh access point, and relay the JOIN OFFER message to the potential parent mesh access point, such that the potential parent mesh access point can join the controller via the selected parent mesh access point.

2. A method as recited in claim 1, further comprising detecting whether there has been a link failure in the tree topology, and in the case there is a link failure, re-calculating the tree topology and sending out one or more JOIN OFFER messages to re-establish the tree topology.

3. A method as recited in claim 2, wherein the detecting link failure uses reports sent by parent mesh access points.

4. A method as recited in claim 2, wherein the detecting link failure uses a heartbeat mechanism.

5. A method as recited in claim 1, further comprising determining alternate/backup potential parents, and sending the alternate/backup potential parents to mesh points of the mesh network.

6. A method of operating a mesh access point comprising: receiving one or more beacon and/or probe response frames in a particular lightweight mesh access point that has a secure tunnel to a controller, the beacons and/or probe responses being from one or more neighboring access points, the controller being configured for controlling the access point functionality of a set of lightweight access points including the particular mesh access point using messages between each lightweight mesh access point and the controller using a first protocol; sending a radio measurement report to the controller, including information on the one or more neighboring access points; receiving from the controller a JOIN OFFER message to relay to a second mesh access point so that the second mesh access point can become a child mesh access point of the particular mesh access point, the JOIN OFFER frame sent by the controller as a result of the controller determining a tree topology, including determining the tree with the particular mesh access point a selected parent access point to the second mesh access point; relaying the JOIN OFFER message to the second mesh access point; and receiving a JOIN REQUEST message from the second mesh access point as a result of the second mesh access point receiving the JOIN OFFER message to join the mesh, such that the second mesh access point joins the controller, including forming a secure tunnel to the controller.

7. A method as recited in claim 6, further comprising repeating through with one or more additional mesh access points.

8. A method as recited in claim 6, further comprising: prior to the relaying of the JOIN OFFER message to the second mesh access point, securing an L2 link between the second mesh access point and particular mesh access point.

9. A method of operating a mesh access point comprising: in a particular lightweight access point, receiving a JOIN OFFER message from a first parent mesh access point, the particular lightweight access point having the capability of being a mesh access point of a wireless mesh network by joining the mesh via a parent mesh access point that has a secure tunnel to a controller and that is part of the wireless mesh network, the controller configured for controlling the access point functionality of a set of lightweight access points including the parent mesh access point using messages between each lightweight mesh access point and the controller using a first protocol, wherein the JOIN OFFER message is generated at the controller as a result of the controller carrying out a parent selection process including: the controller receiving radio measurement report from one or more mesh access points about neighboring access points to the one or more mesh access points, and the controller determining a tree topology, including determining the tree with the first parent mesh access point a selected parent access point to the particular mesh access point; and the particular lightweight access point joining the mesh network by joining the controller via the first parent mesh access point, including forming a secure tunnel to the controller.

10. A method as recited in claim 9, further comprising: prior to the receiving of the JOIN OFFER message from the first parent mesh access point, securing an L2 link between the first parent mesh access point and the particular mesh access point.

11. A method as recited in claim 9, further comprising: after, receiving a different JOIN OFFER message via a second parent mesh access point indicating a different selected parent mesh access point than the first parent mesh access point; after receiving the different JOIN OFFER message, leaving the first parent mesh access point and joining the mesh network by joining the controller via the different selected parent mesh access point, including forming a secure tunnel to the controller via the different selected parent mesh access point.

12. A method as recited in claim 9, wherein the joining via the different selected parent mesh access point is a rapid roam using a rapid roaming method.

13. A method as recited in claim 9, further comprising: after, in the case of losing connection to the first parent mesh access point, waiting for a new JOIN OFFER message via a second parent mesh access point indicating a different selected parent mesh access point than the first parent mesh access point; after receiving the different JOIN OFFER message, joining the mesh network by joining the controller via the different selected parent mesh access point, including forming a secure tunnel to the controller via the different selected parent mesh access point.

14. A method as recited in claim 13, wherein the waiting is for at most a pre-defined waiting period, and wherein, after waiting and not receiving a NEW JOIN OFFER for the pre-defined waiting period, the particular mesh access point finds a parent using a local tree building method.

15. A computer readable storage medium having instructions stored thereon that when executed by one or more processors of a processing system, cause carrying out a method comprising: receiving one or more beacon and/or probe response frames in a particular lightweight mesh access point that has a secure tunnel to a controller, the beacons and/or probe responses being from one or more neighboring access points, the controller being configured for controlling the access point functionality of a set of lightweight access points including the particular mesh access point using messages between each lightweight mesh access point and the controller using a first protocol; sending a radio measurement report to the controller, including information on the one or more neighboring access points; receiving from the controller a JOIN OFFER message to relay to a second mesh access point so that the second mesh access point can become a child mesh access point of the particular mesh access point, the JOIN OFFER frame sent by the controller as a result of the controller determining a tree topology, including determining the tree with the particular mesh access point a selected parent access point to the second mesh access point; relaying the JOIN OFFER message to the second mesh access point; and receiving a JOIN REQUEST message from the second mesh access point as a result of the second mesh access point receiving the JOIN OFFER message to join the mesh, such that the second mesh access point joins the controller, including forming a secure tunnel to the controller.

16. A computer readable storage medium having instructions stored thereon that when executed by one or more processors, cause carrying out a method comprising: receiving at a controller radio measurement reports from at least one mesh access point about neighbors of the at least one mesh access points, the mesh access points being mesh points of a wireless mesh network, wherein the access point functionality of each mesh access point is controlled by the controller using messages between each mesh access point and the controller using a first protocol, the controller connected to a root mesh access point that forms the root of the mesh network; determining a tree topology for the wireless mesh network, including determining a potential parent access point and a selected parent access point to the parent of the potential parent access point; and sending a JOIN OFFER message to the potential parent access point and via the selected parent access point to offer the potential parent access point to join the mesh with the selected parent mesh access point as its parent, such that the selected parent mesh access point forms a secure link to the potential parent mesh access point, and relay the JOIN OFFER message to the potential parent mesh access point, such that the potential parent mesh access point can join the controller via the selected parent mesh access point.

17. A computer readable storage medium having instructions stored thereon that when executed by one or more processors, cause carrying out a method comprising: receiving a JOIN OFFER message in a particular lightweight access point from a first parent mesh access point, the particular lightweight access point having the capability of being a mesh access point of a wireless mesh network by joining the mesh via a parent mesh access point that has a secure tunnel to a controller and that is part of the wireless mesh network, the controller configured for controlling the access point functionality of a set of lightweight access points including the parent mesh access point using messages between each lightweight mesh access point and the controller using a first protocol, wherein the JOIN OFFER message is generated at the controller as a result of the controller carrying out a parent selection process including: the controller receiving radio measurement report from one or more mesh access points about neighboring access points to the one or more mesh access points, and the controller determining a tree topology, including determining the tree with the first parent mesh access point a selected parent access point to the particular mesh access point; and causing the particular lightweight access point to join the mesh network by joining the controller via the first parent mesh access point, including forming a secure tunnel to the controller.

18. An apparatus comprising: means in a controller for receiving radio measurement reports from at least one mesh access point about neighbors of at least one mesh access points of a wireless network of mesh access points, wherein the access point functionality of each mesh access point is controlled by the controller using messages between each mesh access point and the controller using a first protocol, the controller connected to a root mesh access point that forms the root of the mesh network; means in the controller for determining a tree topology for the mesh network, including determining a potential parent access point and a selected parent access point to the parent of the potential parent access point; and means for sending a JOIN OFFER message to the potential parent access point and via the selected parent access point to offer the potential parent access point to join the mesh with the selected parent mesh access point as its parent, such that the selected parent mesh access point forms a secure link to the potential parent mesh access point, and relay the JOIN OFFER message to the potential parent mesh access point, such that the potential parent mesh access point can join the controller via the selected parent mesh access point.

19. An apparatus comprising: means in a particular lightweight mesh access point for receiving one or more beacon and probe response frames from one or more neighboring access points, the particular lightweight mesh access point having a secure tunnel to a controller and being a mesh access point of a wireless mesh network, the controller configured for controlling the access point functionality of a set of lightweight access points including the particular mesh access point using messages between each lightweight mesh access point and the controller using a first protocol; means in the particular lightweight mesh access point for sending a radio measurement report to the controller, including information on the one or more neighboring access points; means in the particular lightweight mesh access point for receiving from the controller a JOIN OFFER message to relay to a second mesh access point so that the second mesh access point can become a child mesh access point of the particular mesh access point, the JOIN OFFER frame sent by the controller as a result of the controller determining a tree topology of the mesh network, including determining the tree with the particular mesh access point a selected parent access point to the second mesh access point; means in the particular lightweight mesh access point for relaying the JOIN OFFER message to the second mesh access point; and means in the particular lightweight mesh access point for receiving a JOIN REQUEST message from the second mesh access point as a result of the second mesh access point receiving the JOIN OFFER message to join the mesh, such that the second mesh access point joins the controller, including forming a secure tunnel to the controller.

20. An apparatus comprising: means for receiving a JOIN OFFER message, the means for receiving being in a lightweight mesh access point that can be a mesh access point of a mesh network by joining the mesh via a parent mesh access point that has a secure tunnel to a controller and that is part of the wireless mesh network, the controller configured for controlling the access point functionality of a set of lightweight access points including the parent mesh access point using messages between each lightweight mesh access point and the controller using a first protocol from a first parent mesh access point, the JOIN OFFER message generated at the controller as a result of the controller carrying out a parent selection process including: the controller receiving radio measurement report from one or more mesh access points about neighboring access points to the one or more mesh access points, and the controller determining a tree topology, including determining the tree with the first parent mesh access point a selected parent access point to the particular mesh access point; and means in the lightweight mesh access point for joining the mesh network by joining the controller via the first parent mesh access point, including forming a secure tunnel to the controller.

* * * * *

UNITED STATES PATENT AND TRADEMARK OFFICE
CERTIFICATE OF CORRECTION

| | |
|---|---|
| PATENT NO. | : 7,496,078 B2 |
| APPLICATION NO. | : 11/464568 |
| DATED | : February 24, 2009 |
| INVENTOR(S) | : Rahman |

It is certified that error appears in the above-identified patent and that said Letters Patent is hereby corrected as shown below:

In col. 1, line 64, after "potential" change "parent" to --child--.
In col. 1, line 64, after "selected parent AP" change "to" to --as--.
In col. 1, line 65, after "potential" change "parent" to --child--.
In col. 1, line 66, after "potential" change "parent" to --child--.
In col. 1, line 67, after "potential" change "parent" to --child--.

In col. 2, line 3, after "potential" change "parent" to --child--.
In col. 2, line 4, after "potential" change "parent" to --child--.
In col. 2, line 5, after "potential" change "parent" to --child--.

In col. 3, line 32, after "potential" change "parent" to --child--.
In col. 3, line 33, after "selected parent AP" change "to" to --as--.
In col. 3, line 33, after "potential" change "parent" to --child--.
In col. 3, line 35, after "potential" change "parent" to --child--.
In col. 3, line 36, after "potential" change "parent" to --child--.
In col. 3, line 38, after "potential" change "parent" to --child--.
In col. 3, line 40, before "mesh AP, such" change "parent" to --child--.
In col. 3, line 40, after "potential" change "parent" to --child--.

In col. 21, line 33, after "potential" change "parent" to --child--.
In col. 21, line 34, after "selected parent access point" change "to" to --as--.
In col. 21, line 35, after "potential" change "parent" to --child--.
In col. 21, line 36, after "potential" change "parent" to --child--.
In col. 21, line 37, after "potential" change "parent" to --child--.
In col. 21, line 41, after "potential" change "parent" to --child--.
In col. 21, line 42, after "potential" change "parent" to --child--.
In col. 21, line 43, before "mesh" change "parent" to --child--.

Signed and Sealed this
Sixteenth Day of October, 2012

David J. Kappos
*Director of the United States Patent and Trademark Office*

CERTIFICATE OF CORRECTION (continued)
U.S. Pat. No. 7,496,078 B2

In col. 23, line 51, after "potential" change "parent" to --child--.
In col. 23, line 52, before "the parent of" change "to" to --as--.
In col. 23, line 52, after "potential" change "parent" to --child--.
In col. 23, at the beginning of line 55, change "parent" to --child--.
In col. 23, line 55, after "potential" change "parent" to --child--.
In col. 23, line 58, after "potential" change "parent" to --child--.
In col. 23, line 59, after "potential" change "parent" to --child--.
In col. 23, line 60, after "potential" change "parent" to --child--.

In col. 24, line 30, after "potential" change "parent" to --child--.
In col. 24, line 31, before "the parent of" change "to" to --as--.
In col. 24, line 31, after "potential" change "parent" to --child--.
In col. 24, line 33, after "potential" change "parent" to --child--.
In col. 24, line 34, after "potential" change "parent" to --child--.
In col. 24, line 37, after "potential" change "parent" to --child--.
In col. 24, line 38, after "potential" change "parent" to --child--.
In col. 24, line 39, after "potential" change "parent" to --child--.